June 6, 1950  G. G. McPHAUL  2,510,409
ALTERNATELY OPERATED CHANGEABLE SIGN
Filed Nov. 22, 1946  3 Sheets-Sheet 1
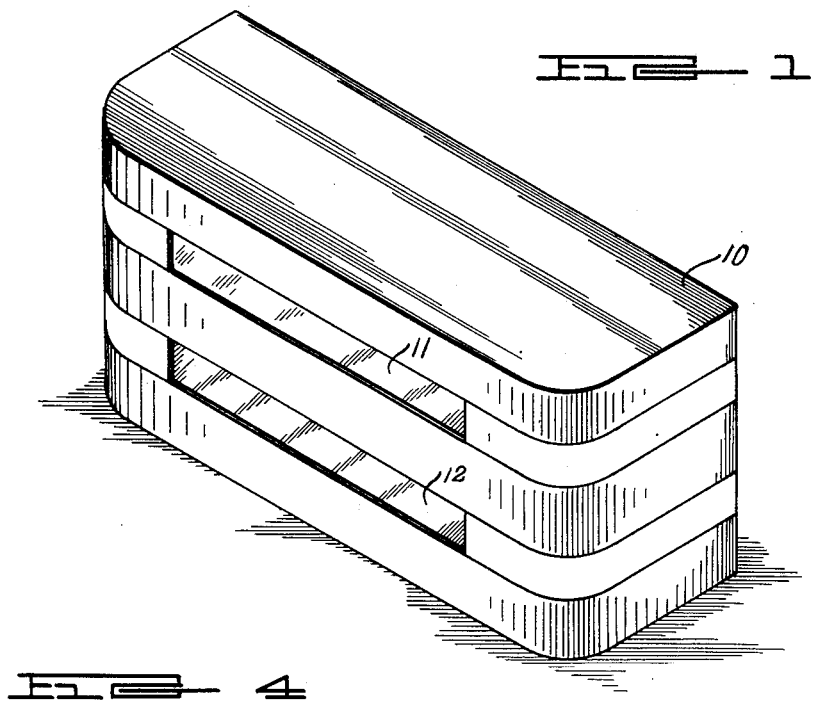
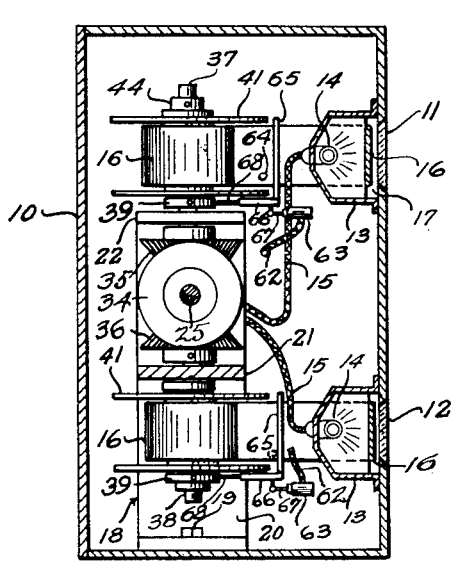
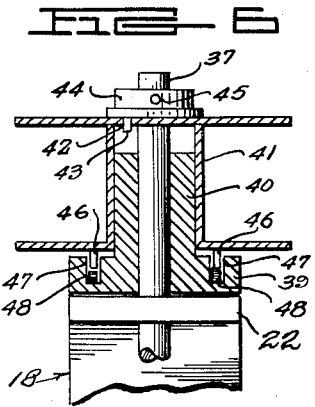
Inventor
GEORGE G. McPHAUL
By *Clarence A. O'Brien and Harvey B. Jacobson*
Attorneys June 6, 1950            G. G. McPHAUL            2,510,409
ALTERNATELY OPERATED CHANGEABLE SIGN
Filed Nov. 22, 1946            3 Sheets-Sheet 2
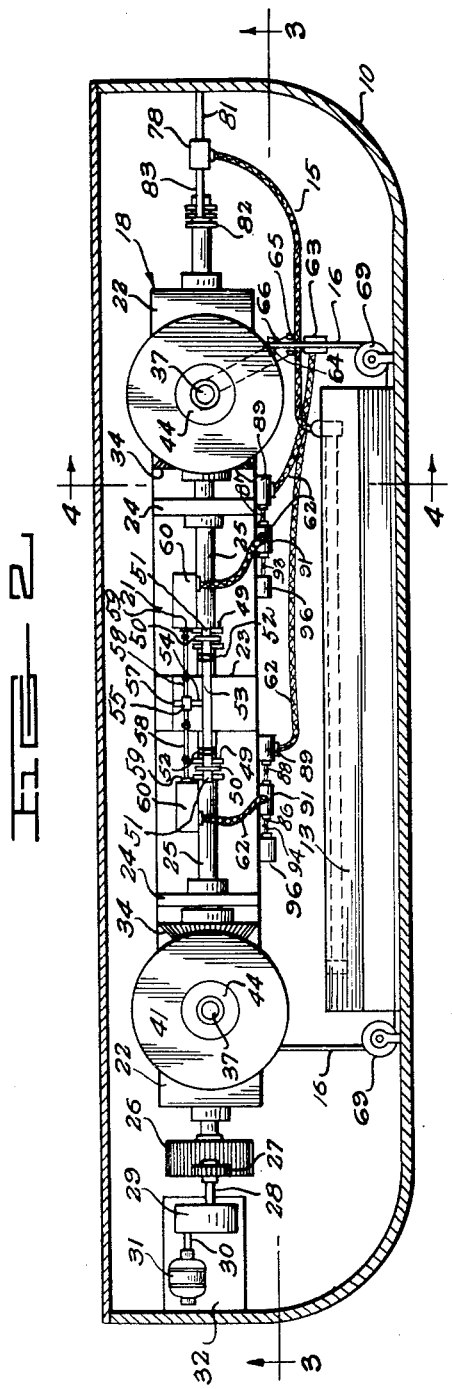
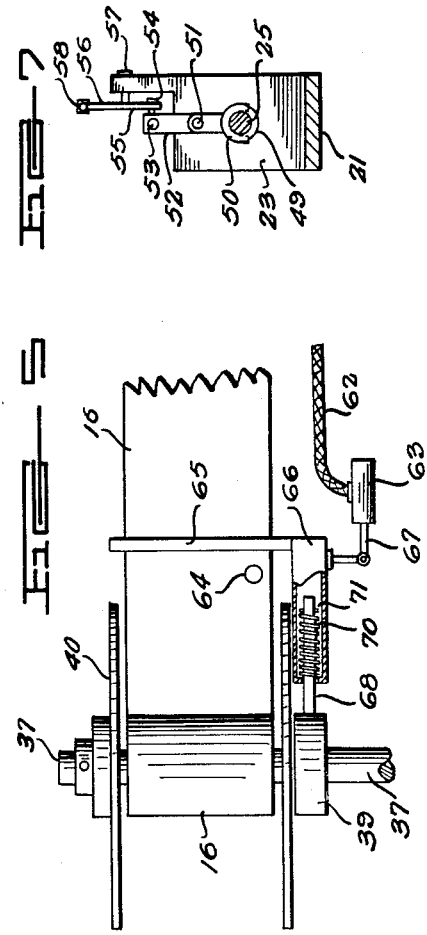
Inventor
GEORGE G. McPHAUL
By *Clarence A. O'Brien*
*and Harvey B. Jacobson*
Attorneys

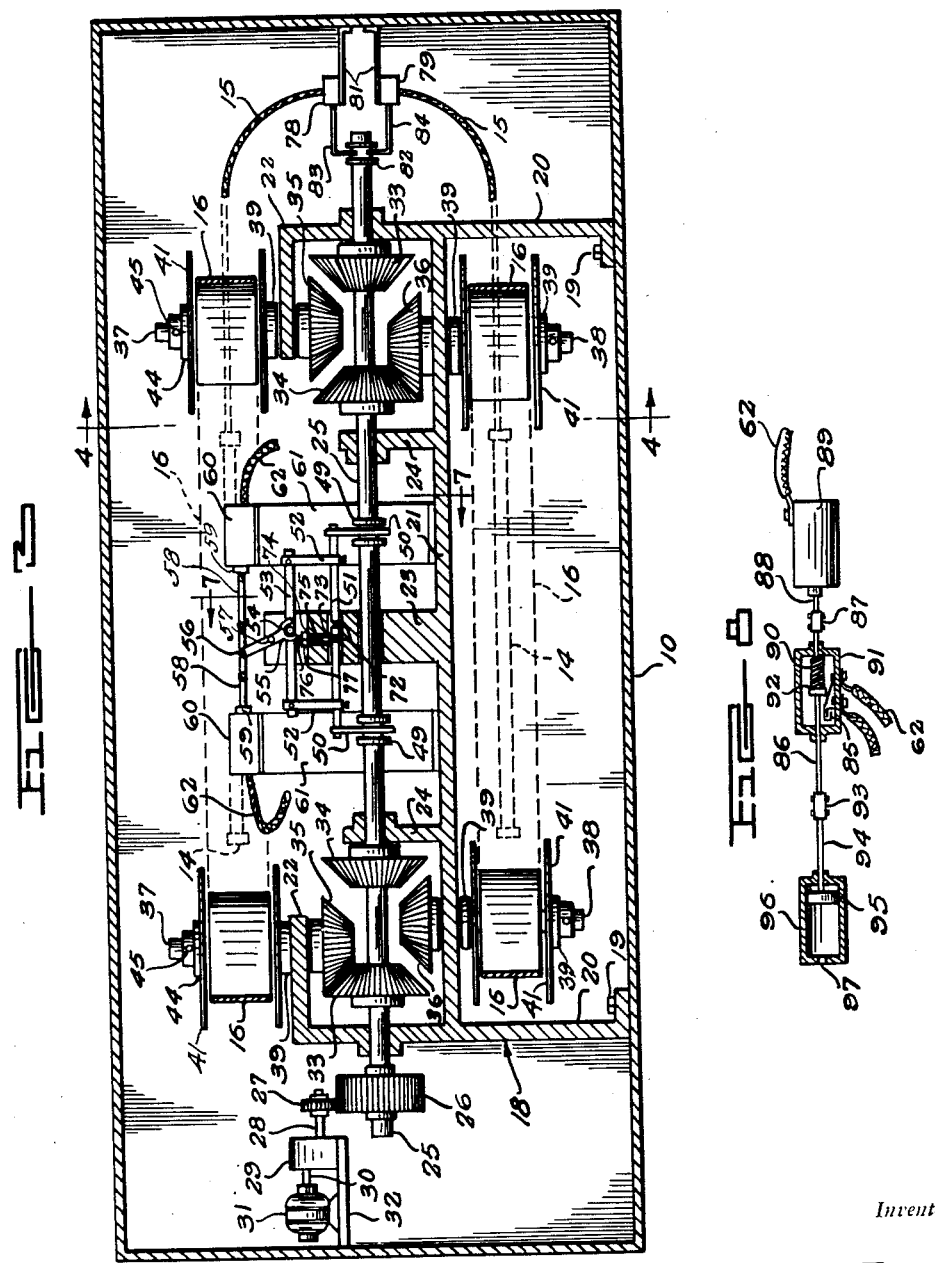

Patented June 6, 1950

2,510,409

UNITED STATES PATENT OFFICE 2,510,409

ALTERNATELY OPERATED CHANGEABLE SIGN

George G. McPhaul, Fort Worth, Tex.

Application November 22, 1946, Serial No. 711,712

7 Claims. (Cl. 40—53)

This invention relates to an electromechanical traveling sign, employing a plurality, preferably a pair of tapes, mounted to move in front of illuminating means behind openings in an enclosure or cabinet for various advertising purposes, and wound upon reels or spools, so that when one tape has been passed to view, and entirely unwound from one reel and wound upon another reel, electromechanical means will be brought into play to reverse the movement and winding thereof, and to automatically start and cause movement of another tape while the first tape is being reversed and wound upon the reel from which it has been unwound, so that the tapes are alternately passed to view automatically and without manual intervention.

Another object of the invention is to provide novel means whereby the winding and unwinding of the tapes is automatically accomplished at the end of each tape, while automatically starting the movement of the other tape to cause the same to pass in view, said means being automatically operated at the end of each tape after passing in review, by the actuation of a switch causing the energization of electromagnets or solenoids, for the purpose of reversing the driving mechanism for the reels or spools, through gearing, by which the opposite reels are alternately automatically connected and disconnected to reverse the operation of the reels and the movement of the tapes one at a time, preferably in an adverse direction to the direction of reading.

Another object of the invention is to provide a traveling sign of the class described, having a movable drive shaft driven by a suitable source of power such as an electric motor, and adapted to be shifted, for the purpose of alternately connecting and disconnecting the reels at opposite ends of the display portion of the tape through the medium of gearing, to the drive shaft, for alternately moving the same in opposite directions and simultaneously actuating switches, for the purpose of controlling electromagnetic or solenoid means for causing the shifting of the shaft and reversing the driving mechanism to the respective reels.

Another object of the invention is to provide a traveling sign for advertising or other purposes, in which the illuminating means or lamps for the tapes are automatically connected and disconnected, so that only the tape which is moving for display purposes, is illuminated, while the other illuminating means has been extinguished while the tape is being rewound in the opposite direction, thus providing a continuous sign which is attractive and of a traveling character of almost unlimited capacity, the cabinet being designed in any size desired and designed to run the full length of a show window, theater front, or as small or as large as desired.

Another object of the invention is to provide novel means for actuating the switches controlling the electromagnets or solenoids for causing the shifting of the drive shaft and the gearing, for alternately winding and unwinding the display or sign tapes in opposite directions while simultaneously actuating the switches controlling the illuminating means, in a simple, economical and novel way.

Other objects and advantages reside in the details of construction and operation as more fully hereinafter described and claimed, reference being had to the accompanying drawings forming part hereof, wherein like numerals refer to like parts throughout, and in which:

Figure 1 is a perspective view of an electromechanical traveling sign of my invention, and provided with an enclosing cabinet;

Figure 2 is a horizontal sectional view thereof with the cabinet in section and the mechanism in elevation for a top plan;

Figure 3 is a vertical sectional elevation taken on the line 3—3 of Figure 2;

Figure 4 is a transverse vertical sectional view taken on the line 4—4 of Figure 2;

Figure 5 is an enlarged fragmentary detail sectional elevation showing the manner of operating the control switches for the electromagnets or solenoids from the traveling tapes;

Figure 6 is an enlarged fragmentary detail sectional elevation showing the mounting of the reels or driving the same and eliminating sideplay in the spools as well as holding the same in alignment, as well as to take up slack in the sign tapes, Figure 7 is an enlarged detail view showing the shifting means for the driving shaft and means to prevent the shaft from shifting in reverse positions, and Figure 8 is an enlarged detailed sectional elevation of a delayed action switch mechanism employed with the device.

Referring to the drawings: The electromechanical traveling sign in accordance with the present invention, comprises a cabinet 10, preferably of elongated rectangular form having view openings or windows 11 and 12 in the front wall thereof, parallel to each other and extending horizontally one above the other. Mounted in rear of each opening or view window 11 and 12, is a reflector 13 adapted to contain an illuminating means such as an elongated tubular vapor lamp 14 to which cables 15 extend. The lamps are disposed in rear of the tapes 16 passing through slots 17 in the ends of the reflectors. The tapes may be of transparent or translucent material upon which the matter to be displayed for advertising or other purposes, displayed or depicted, to be viewed as the tapes move across the openings traveling in either direction, horizontally, but preferably adverse to the direction of reading, especially in connection with reading matter.

The operating mechanism is mounted in a suitable frame work or casting 18 supported upon and secured to the bottom of the cabinet 10 in any suitable way, as indicated at 19, and of any suitable conforming construction including a pair of end uprights 20 connected by a horizontal connecting member 21 and upper inwardly extending arms or frame members 22 constituting bearings. The base or cross member connecting the uprights 20 is provided with a central bearing member 23 and a pair of spaced upright bearing members 24 between the same and the upright end members 20 of the frame 18.

A shiftable driven shaft 25 is slidable in the bearings of the members 23 and 24 and is adapted to be driven in any suitable way, such as providing thereon a relatively wide spur gear 26 meshing with a pinion 27 on the shaft 28 of a reduction gearing 29 driven by the shaft 30 of an electric motor 31 mounted upon a suitable support or base 32 within the casing 10. Mounted upon the shaft 25 are spaced fixed beveled gears 33 and 34 facing in opposite directions and arranged in pairs on the shaft 25 and adapted to be alternately brought into engagement with similar beveled gears 35 and 36 respectively fixed to short vertical shafts 37 and 38 arranged in staggered relation one above the other and journaled in the bearings of the frame portions 22 and the connecting member 21 above and below the shaft respectively to be alternately engaged with the respective gears 33 and 34 respectively. As shown in Figure 6, bearing portions 39 and hubs 40 in the form of sleeves are provided, upon which the spools or reels 41 upon which the ends of the tapes 16 are wound, are rotatably mounted. They may form part of the frame or casting projecting upwardly and downwardly into the hubs of the spools or reels to provide long bearings upon which the spools are adapted to freely turn so as to eliminate sideplay while holding the spools in alignment. The spools are provided with one or more openings 42 designed to be engaged by a pin 43 on a collar 44 fixed to the end of each shaft 37 and 38 remote from the beveled gears and pinned or otherwise fixed to rotate with the shafts as indicated at 45, so that the spools will rotate with the respective shafts and gears thereof. Friction brake pins or brushes 46 are carried in sockets or counter-bores 47 of the respective bearings or collars 39 and are urged resiliently by coil springs 48 into frictional engagement with the reels or spools so that while the bearings 40 projecting into the hubs of the reels or spools eliminate sideplay and hold the spools in alignment or true horizontal positions, the pins or brushes 46 act as brakes to cause a drag on the spools to eliminate slack in the display or sign tapes 16 and keep them on an even keel.

The driven shaft 25 is adapted to be shifted in opposite directions while maintaining the pinion or spur gear 27 in constant engagement with the spur gear or pinion 26 while constantly driven from the motor 31 through the reduction gearing 29. In order to shift the shaft 25 in opposite directions for alternately engaging the gears 33 with the gears 35 and the gears 34 with the gears 36 of the respective upper and lower shafts 37 and 38 for driving the respective tapes 16 wound upon the reels or spools carried thereby, electromechanical means are provided. For this purpose, grooved collars 49 are fixed to the shaft 25 on opposite sides of the upright bearing 23 and are engaged by forks 50 fixed to the ends of a shifting rod 51 slidable in the bearing 23 parallel to the shaft 25. Arms 52 are fixed by set screws or otherwise to the rod 51 and fixed to the ends of a shifting bar 53 also parallel to shaft 25 and rod 51 at one side of the bearing 23. The bar 53 bears a pin 54 engaged by the forked arm 55 of a shift lever 56 fulcrumed at 57 on the bearing 23, with its short arm extending downwardly and its long arm extending upwardly for connection by links 58 to the armatures or cores 59 of electromagnets or solenoids 60 suitably supported by upright supports or frame members 61 upon the frame 18, as by means of the connecting member 21. The windings of the electromagnets or solenoids 60 are connected by conductor cables 62, to suitably actuated switches 63 designed to alternately energize and de-energize the windings of the electromagnets or solenoids 60 to alternately shift or slide the shaft 25 in opposite directions for alternately winding the tapes upon a reel or spool 40 at one end and when the end thereof has been reached, to unwind the same from the spool or reel upon which it has been wound to wind the same upon the reel or spool at the opposite end, so that while one of the tapes is being moved for display purposes illuminated as described, the other tape is being rewound in the opposite direction with its illuminating means extinguished, so that one of the tapes is being displayed while the other is being rewound and vice versa.

For this purpose, each of the tapes 16 is provided near one end thereof with a projecting stop member or rivet 64 adapted as the tapes operate through slotted or bifurcated upright arms 65 to strike and move said arms. The arms 65 are mounted upon movable tubular members 66 and connected at 67 to the movable contacts of the switches 63 connected to the electromagnets or solenoids 60 and movably mounted or telescoping over supporting and guiding pins 68 projecting forwardly and rigidly attached to the bearings or collars 39 of the respective spool shafts on which the reels or spools 40 turn. The tapes 16 extend forwardly through the arms 65 and around guide or idler spools or pulleys 69 mounted at the front of the housing or cabinet 10 at each end of the view windows or openings 11 and 12, lamps 14 and reflectors 13. Springs 70 are mounted on the pins 68 between cotter pins or stops 71 and the ends of the tubular members or sleeves 66 to normally force the latter and the arms 65 inwardly or rearwardly to actuate the switches 63 or alternately opening and closing the same to correspondingly energize and de-energize the electro-magnets or solenoids 60 upon the end of each tape being reached and the projections or rivets 64 striking the arms 65 without being permitted to pass through the slots thereof with the tapes to actuate the switches 63 by the connections 67 with the movable tubes 66 upon which the arms 65 are mounted, against the action of the springs 70 so as to alternately shift the shaft 25 in opposite directions for reversing the drives of the respective upper and lower shafts 37 and 38 to wind and rewind the tapes 16 on the reels 40.

In order to hold the shaft in either shifted position firmly when the machine reverses itself either the shaft 25 or the shaft or rod 51 is provided with a pair of spaced annular grooves 72 of conical or tapered cross-section with beveled sides engaged by a tapered plunger 73 movable in a bore 74 in the bearing 23 and resiliently urged by a spring 75 into one of the respective grooves 72. The tension of the spring may be adjusted by a screw 76 inserted in the counter-bore 74 and held by a lock nut 77 if desired mounted on the end of the screw to engage the bearings 23. Thus, when the shaft is shifted in opposite directions, the plunger will engage one of the grooves 72 to hold the shaft firm in either shifted position, so that the gears at the opposite ends of the shaft 25 are maintained in mesh in reverse positions of the gearing while the reels are being driven in opposite directions to wind and unwind the tapes and alternately display one while being illuminated and reversing the other while the illuminating means is extinguished. In order to alternately illuminate and extinguish the respective illuminating means or lamps 14 of the upper and lower windows or view openings 11 and 12 and the tapes passing in front of the same, one end of the shaft 25 is provided with connections to oppositely operated switches 78 and 79 connected by wiring in the cables 15 with the respective lamps. The switches 78 and 79 are suitably supported by brackets 81 at one end of the cabinet 10 and the shaft 25 carries a grooved collar 82 engaged by forked arms 83 and 84 connected with the respective switches 78 and 79 for actuating the movable contacts thereof for alternately opening and closing the switches so that when one switch is closed, the other switch is opened. Thus, one of the panels or view openings is illuminated in rear of its respective tape 16, while the other illuminating means is extinguished during the rewinding of its tape so that the display is continuous, one tape being moved in illuminated displaying position while moved in one direction while the other tape is being rewound in the opposite direction and vice versa, so that both of the tapes are alternately wound upon one reel while moving in one direction and then rewound while moving in the opposite direction upon the reel from which it has been wound and rewound upon the reel from which it has been unwound.

Thus, in the operation of the device, with one of the tapes unwound after displaying the advertising matter thereon, from one reel and wound upon the other, one of the projections or rivets 64 strikes an arm 65 to actuate its switch 63, at the same time extinguishing its lamp 14 by opening its switch 78 and the circuit from the source of electrical current to said lamp. The other tape has been previously wound upon the corresponding reel and as the switch 63 is actuated, the electro-magnets are respectively energized and de-energized, to attract and release its armature for shifting the shaft 25 to the respective connections of the armatures or cores 59 of the electro-magnets or solenoids 60, to alternately move the gears 33 into the mesh with the gear 35 at one end and the gear 34 intermesh with the gear 36 at the opposite end so that the other tape is unwound and displayed while the first tape is being rewound. This operation is reversed upon opposite shifting of the shaft 25 upon actuation of the switches 63 to open and close the same, to reverse the movement of travel of the tapes, so that one is being constantly displayed while the other is being rewound. The device may be made in any suitable length, using any suitable number of tapes and reels, so that the operation is relatively continuous, although two tapes alternately operated as described, will give the result described.

Attention is also directed to the fact that the sign panels or windows 11 and 12 are provided with panes of translucent glass so that when the sign panels are lighted, the reading matter or advertising is visible therethrough and the tape or film outlined is not visible. However, when the panel is blacked out, by extinguishing the lighting means, and when the tape or film is being rewound, the tape or film is not visible and will not detract from the opposite panel which is being shown or exhibited.

Also, a delayed action switch may be interposed between the switches 63 and solenoids 60 that shift the machine and reverse the gearing drive, by interposing a pull type switch 85 between the switches 63 and the solenoids 60, embodying a stationary contact and a movable contact, actuated by a cam or collar 92 on a rod 86 in turn coupled at 87 to the armature 88 of a small solenoid or electro-magnet 89, the coil or windings of which have their terminals connected to the switches 63. The spring 90 is enclosed in a cylinder 91 on the rod 86 and engages the collar 92 on said rod within the cylinder or tube 91 so as to normally hold the switch 85 open with the movable contact thereof disengaged from the stationary contact. The rod 86 is coupled, as at 93, to the plunger shaft or piston rod 94 of a piston 95 operating in an air or compression cylinder 96 having an air vent 97 at one end, two of such assemblies being provided, one for each tape, so that when the switch 63 is actuated, the solenoid or electro-magnet 89 thereof is energized to close the switch 85, causing one of the solenoids or electro-magnets 60 to be energized for shifting the gear drive to reverse the latter. The cushioning or checking means at the opposite end of the rod connecting the movable contact of the switch 85 to the armature of the solenoid 89 delays the closing of the delayed action switch 85, causing the respective solenoid or electro-magnet 60 to be energized for a longer period of time, which provides ample time for the gears to mesh and the shift to be completed, before reversing the movements of the tapes, in exhibiting and rewinding the same by the actuation of the switch 63 at one end of each tape or film. Thus, each tape or film strip is exhibited when unwinding from a right-hand spool and winding on a left-hand spool, until its projection or stop member formed by the rivet 64 engages an arm 65 to close its respective switch 63, resulting in the shifting and reversing of the gear drive, to rewind the exhibited tape or film strip on the right-hand spool or reel as unwound from its corresponding left-hand reel or spool, while the other tape or film strip is being unwound from its right-hand reel or spool and wound on the corresponding left-hand reel or spool while being exhibited, until its stop or rivet 64 engages the corresponding arm 65 to close its switch 63. Thus, while one tape or film is being exhibited, the other is being rewound, and this operation is repeated.

While in the foregoing there has been shown and described, the preferred embodiment of this invention, it is to be understood that minor changes in the details of construction, combination and arrangement of parts may be resorted to without departing from the spirit and scope of the invention as claimed.

What I claim as my invention is:

1. In a travelling sign, a casing, provided with a pair of display windows, a pair of sign carrying tapes stretched behind said windows, a pair of reels associated with each tape for holding the same stretched and for moving the tape in both directions by winding and unwinding said reels, an illuminating device behind each of said tapes, said illuminating devices operating alternatively to illuminate one tape of the pair, driving means for the reels, moving the tapes of the pair in opposite directions, means carried by a tape and means in operative relation to the aforesaid means for changing the direction of driving of the reels, and means for alternatively switching in the illumination device behind a tape moving in one direction, while cutting out the illumination device behind the tape moving in the opposite direction.

2. A travelling sign comprising a casing, provided with a pair of display windows, a pair of sign carrying tapes, stretched behind said display windows, a pair of reels associated with each tape for holding the same stretched behind the window and for moving said tape in both directions by winding and unwinding the same on said reels, an illuminating device behind each of said tapes, said illuminating devices operating alternatively to illuminate one tape of the pair, a driving shaft for each reel, gear members on each of said reel driving shafts, a slidable shaft arranged within said casing in substantial parallelism with said tape, gear members on said slidable shaft adapted to alternatively engage gear members of the reel driving shaft for driving the tapes in opposite directions, means carried by a tape and means in operative relation to the aforesaid means for changing the direction of driving of the reels, and means for alternatively switching in the illumination device behind one tape, moving in one direction, while cutting out the illumination device behind the other tape, moving in an opposite direction.

3. A travelling sign comprising a casing, provided with a pair of display windows, a pair of sign carrying tapes, stretched behind said display windows, a pair of reels associated with each tape for holding the same stretched behind the window and for moving said tape in both directions by winding and unwinding the same on said reels, an illuminating device behind each of said tapes, said illuminating devices operating alternatively to illuminate one tape of the pair, a driving shaft for each reel, gear members on each of said reel driving shafts, a slidable shaft arranged within said casing in substantial parallelism with said tape, pairs of gear members near each end of said slidable shaft, each member of such pair being adapted to engage selectively one of the gear members on the reel shaft for driving it in one direction, the gear members on both ends of the slidable shaft engaging gear members on reel shafts operating different tapes for movement in opposite directions, means carried by a tape and means in operative relation to the aforesaid means for changing the direction of driving of the reels and means for alternatively switching in the illumination device behind one tape moving in one direction while cutting out the illumination device behind the other tape moving in opposite direction.

4. A travelling sign comprising a casing, provided with a pair of display windows, a pair of sign carrying tapes, stretched behind said display windows, a pair of reels associated with each tape for holding the same stretched behind the window and for moving said tape in both directions by winding and unwinding the same on said reels, an illuminating device behind each of said tapes, said illuminating devices operating alternatively to illuminate one tape of the pair, a driving shaft for each reel, gear members on each of said reel driving shafts, a slidable shaft arranged within said casing in substantial parallelism with said tape, gear members on said slidable shaft adapted to alternatively engage gear members of the reel driving shaft for driving the tapes in opposite directions, means for moving said slidable shaft longitudinally for bringing different gear members of the pairs into engagement with the gear members on the reels, including electromagnetic means and operating circuits for the same, means carried by the tape and means in operative relation thereto, including a switching means, controlling the operative circuits of the said electromagnetic means and further switching means operated by the said sliding shaft for switching in and out the illumination devices alternatively.

5. A travelling sign according to and as claimed in claim 4 comprising a delayed action switch interposed between said switching means and said electromagnetic means.

6. In a travelling sign, a casing provided with a pair of display windows, a pair of tapes stretched behind the display windows, reels for winding and unwinding said tapes, arranged near the ends of said display windows, rotatable shafts arranged in pairs near each end of said display windows for driving said reels, driving gear members on each of said shafts, a slidable drive shaft, arranged transversely to said reel driving shafts, gear means on said drive shaft arranged so as to engage gear members of the reel driving shafts, associated with both tapes, and so as to drive them in opposite directions, said gear means engaging pairs of reel driving shafts alternatively so as to change the direction of driving of the tape upon movement of the slidable shaft, shifting means, including a shiftable member and coupling member engaging said slidable shaft associated with the latter, electromagnetic means for moving said shifting means, switches for energizing alternatively the said electromagnetic means operating said shifting means, switch actuators, means arranged near the end of the tape wound on a reel for operating said switch actuators, operating the switch, illuminating devices behind said tapes, and switches controlled by the aforesaid shifting means for alternatively operating the illuminating devices of the tapes of the pair and for cutting out illumination of one tape or switching in the illumination device of the other tape in accordance with the direction of movement imparted to the tape.

7. In a travelling sign, a casing provided with a pair of display windows, a pair of sign carrying tapes, stretched behind said windows, a pair of reels associated with each tape for holding the same stretched behind the display window and for moving the tape in both directions by winding and unwinding on said reels, parallel shafts near the end of each window for driving said reels, an illuminating device behind each of said tapes said illuminating devices operating alternatively to illuminate one tape of the pair, bevel gear wheels in each on said reel shafts, a slidable shaft, arranged in substantial parallelism with the tapes, pairs of bevel gear members on said shafts near each end of the display window, adapted to engage alternatively the bevel gear members on the reel shafts near one end of the window, corresponding members of said pairs on both ends of said shaft engaging reel shafts associated with different tapes, a shifting mechanism for said slidable shaft, including a slide rod, coupled with said shaft for longitudinal movement, a pair of electromagnets for shifting said slide rod, operative circuits for said electromagnets, a switch alternatively closing the circuits of the electromagnets, a switch actuator, including a member extending along said tape, an actuating projecting member on said tape operating said switch actuator and further switching means operated by the sliding movement of the shaft for switching in and out illumination devices upon a shifting movement of the slidable shaft changing said direction of reeling of the tapes.

GEORGE G. McPHAUL.

REFERENCES CITED

The following references are of record in the file of this patent:

UNITED STATES PATENTS

| Number | Name | Date |
| --- | --- | --- |
| 1,050,203 | Bickley | Jan. 14, 1913 |
| 1,768,409 | Kuczorra | June 24, 1930 |
| 2,171,857 | Mageoch | Sept. 5, 1939 |
| 2,192,072 | Fasig | Feb. 27, 1940 |